May 13, 1958 J. G. INGRES 2,834,184
BOOSTER BRAKE MECHANISM
Filed May 5, 1952 2 Sheets-Sheet 1
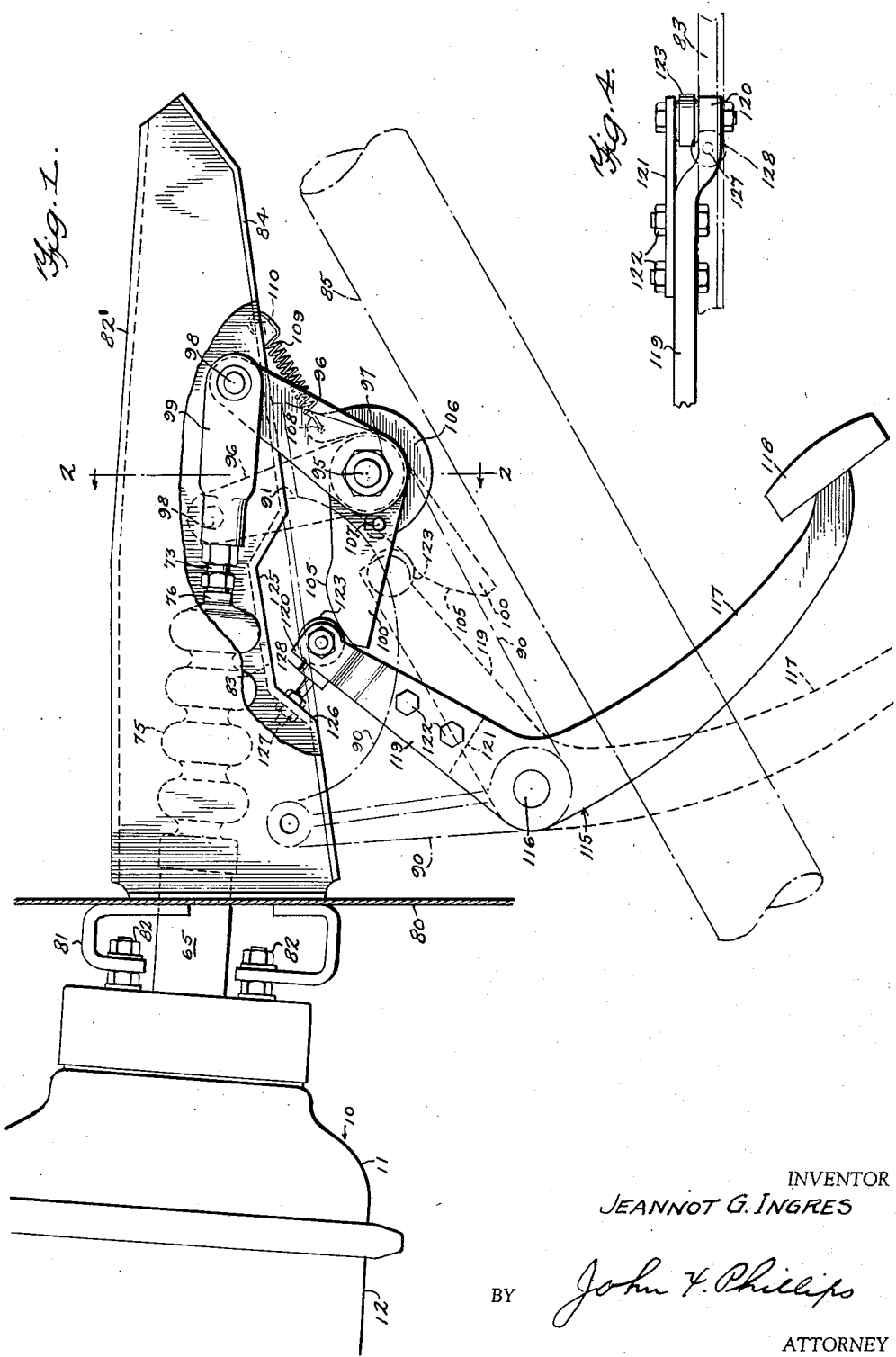
INVENTOR
JEANNOT G. INGRES
BY John F. Phillips
ATTORNEY

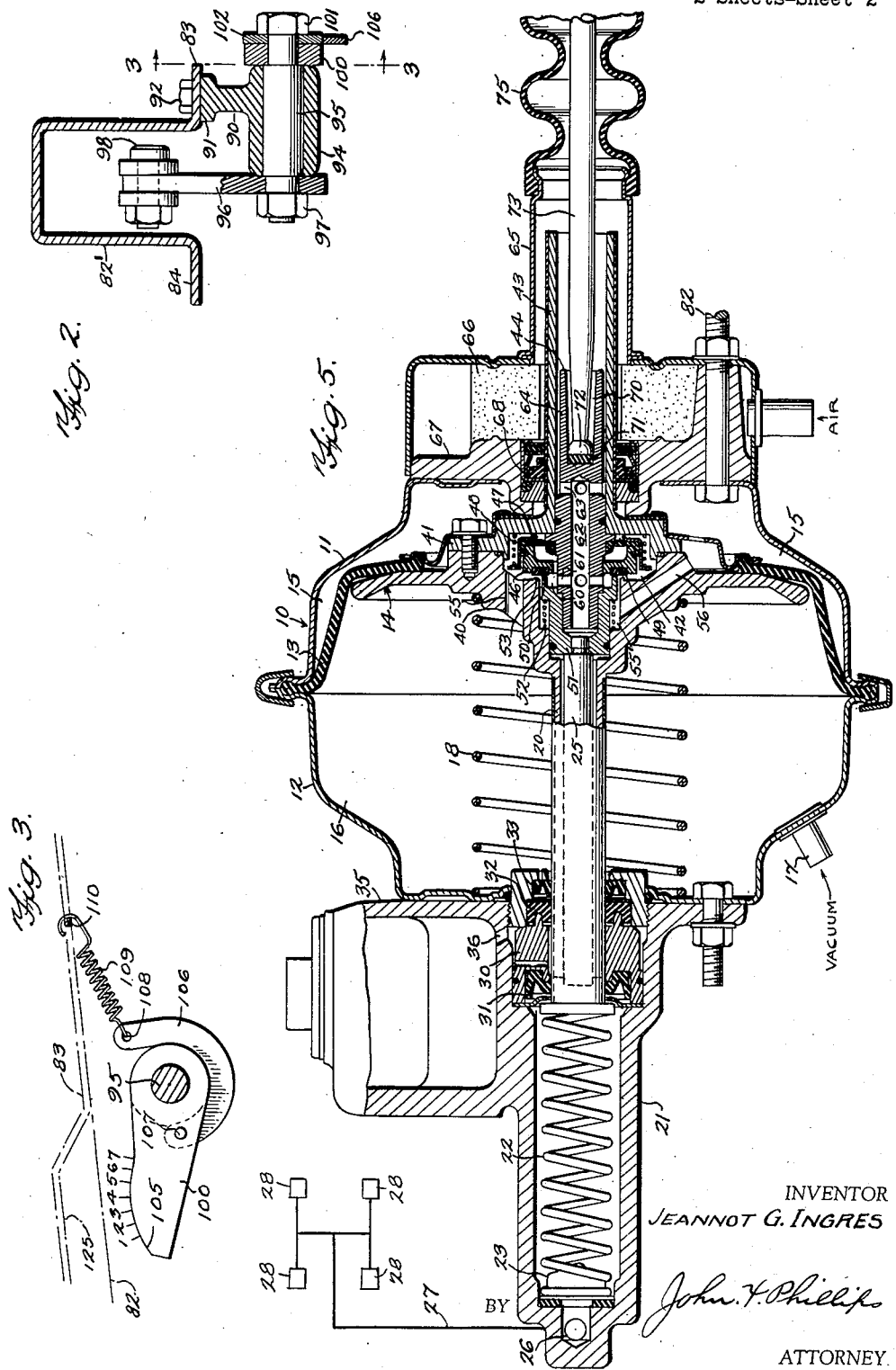

United States Patent Office 2,834,184
Patented May 13, 1958

2,834,184
BOOSTER BRAKE MECHANISM

Jeannot G. Ingres, Dearborn, Mich., assignor to Kelsey Hayes Company, a corporation of Delaware Application May 5, 1952, Serial No. 286,081

9 Claims. (Cl. 60—54.6)

This invention relates to booster brake mechanisms.

As is well known, booster brakes for the hydraulic braking systems of motor vehicles have attained a high degree of efficiency in operation, most of the earlier difficulties encountered in the development of such mechanisms having been overcome. It is still desirable, however, to improve the operating characteristics of mechanisms of this character, particularly from the standpoint of driver-satisfaction. The numerous improvements which have been made in booster brake mechanisms of this type have overcome defects and difficulties in operation from a mechanical standpoint but still leave something to be desired from the standpoint of the motor vehicle driver who operates the brakes.

In mechanisms of this character, a brake pedal is operated by the foot of the operator to perform two functions, namely, to displace brake fluid into the brake lines and to operate the control valve of the booster motor to energize such motor and cause power displacement of hydraulic fluid into the brake lines. Thus the booster motor generally performs most of the work involved in the displacement of brake fluid, a portion of the work being performed by the operator and the braking pressures in the high pressure brake lines reacting to the pedal to provide the latter with the highly desirable "feel." An accurate reproduction to a reduced degree at the brake pedal of reaction forces proportional to brake line pressures has been long sought as an ultimate goal in the operation of a system of this character.

Continued development and research work, however, has indicated that it is not so desirable to provide brake pedal reaction exactly proportionate to increases in braking fluid pressures as it is to provide a smoothly progressing brake reaction from initial operation of the brake pedal to the condition in which the brakes are fully applied. In this connection it has been found desirable to "soften" initial brake pedal movements and to progressively increase brake pedal reaction as brake application progresses. Therefore, in comparison to a proportionate reaction at an intermediate brake position, initial reaction ratios should be relatively low and reaction ratios during the final stages of brake application should be relatively higher.

It is difficult to provide a "soft" initial pedal movement. This is due at least in part to the fact that the pedal-actuated element or elements of the booster brake operate against spring pressures which tend to return the elements to the "off" positions. Such resilient means may be in the form of a biasing return spring directly associated with the manually operable parts, or in the form of return spring means tending to return the control valve parts to the normal or "off" positions. Where the valve return spring or springs are depended upon to return the parts to normal position, such means constitutes the only resilient opposition encountered in initial movement of the brake pedal, frictional resistances being negligible. Where spring means is employed for returning the valves to normal positions and separate spring means urges the manually operable parts of the mechanism to normal or "off" positions, these two spring means combine to oppose initial movement of the brake pedal.

It therefore will be apparent that whatever means may be employed for returning the parts to normal position, such means provides a false resistance to initial movement of the brake pedal, that is, a resistance which bears no relationship to braking pressures in the hydraulic fluid. This initial movement of the brake pedal which transmits movement to the valve mechanism to initially energize the booster motor is generally known as the "cut-in" point, and it is highly desirable to eliminate or at least to substantially minimize the resistance transmitted to the brake pedal at the "cut-in" point.

An important object of the present invention is to provide a booster brake mechanism having in combination therewith operating means connected between the brake pedal and the manually operable parts of the booster mechanism to greatly minimize the resistance to brake pedal operation in the initial movement of the brake pedal, including the minimizing of the resistance normally felt in the brake pedal at the "cut-in" point.

A further object is to provide such a mechanism wherein motion transmitting ratios between the brake pedal and the manually operable parts of the booster brake mechanism progressively decrease from a maximum at the beginning of brake pedal operation to a minimum under conditions in which the brakes are fully applied.

A further object is to provide such an apparatus which embodies in the motion transmitting means a cam capable of design to provide any progression of motion transmitting ratios which may be found desirable between a maximum ratio at the beginning of pedal operation and a minimum ratio under conditions of full brake application.

A further object is to provide an apparatus of this character having means operative when the brake pedal is in the "off" position for adding slightly to the forces of the means normally associated with the booster brake mechanism for tending to hold the brake pedal in the "off" position, thus permitting the use of lighter spring means than is normally employed for this purpose.

A further object is to provide an apparatus of the character just referred to wherein the spring means employed for assisting in holding the brake pedal in "off" position functions during brake pedal operation to assist in overcoming the action of the means tending to return the parts to "off" position, thus further "softening" the operation of the brake pedal.

A further object is to provide a spring-assisting device of the character referred to wherein the force of such spring means progressively increases during brake pedal operation to offer some assistance to the operator in performing his part of the work in manually applying the brakes, thus minimizing to an appreciable extent the manual force applied by the operator in fully applying the brakes.

A further object is to provide an apparatus of this character which is particularly adapted for use with the latest type of suspended brake pedal wherein the pivot of the brake pedal is above the pedal pad and the normal weights of the parts of the brake pedal tend to urge it in a brake-applying direction, the assistant spring means referred to thus being particularly useful in its function of tending to assist in holding the brake pedal in the "off" position.

Other objects and advantages of the invention will become apparent during the course of the following description.

In the drawings I have shown one embodiment of the invention. In this showing:

Fig. 1 is a side elevation of the booster operating mechanism associated with the brake pedal, the fire wall being shown in section, parts being broken away and the steering post of the vehicle being shown in broken lines to orient the parts of the invention shown in Fig. 1 with respect to conventional parts of a motor vehicle;

Fig. 2 is a section taken substantially on line 2—2 of Fig. 1, the push rod operating crank being shown in solid lines;

Fig. 3 is a detail sectional view on line 3—3 of Fig. 2, associated parts of the supporting bracket being shown in broken lines;

Fig. 4 is a fragmentary edge view of the end of the pedal lever opposite the pedal pad, a related bracket flange being shown in construction lines; and Fig. 5 is a longitudinal sectional view through a type of a booster brake mechanism with which the operating mechanism is particularly adapted for use.

The booster brake mechanism shown in Fig. 5 forms no part per se of the present invention, except in the combination claimed, and forms the subject matter of the copending application of David T. Ayers, Jr., Serial No. 318,497, filed November 3, 1952, now Patent No. 2,763,989. Referring to Fig. 5 there is shown a booster brake mechanism of the so-called "master cylinder" type, that is, a booster mechanism in which the high pressure hydraulic fluid chamber is associated with a reservoir for the hydraulic fluid, the high pressure cylinder thus being comparable to a conventional master cylinder.

Such booster mechanism comprises a motor indicated as a whole by the numeral 10 and comprising casing sections 11 and 12 between which is clamped the peripheral portion of a flexible diaphragm 13 forming part of a pressure movable unit indicated as a whole by the numeral 14. The casing sections 11 and 12 form with the pressure movable unit a pair of chambers 15 and 16 respectively.

The present apparatus is particularly intended to utilize the vacuum of the intake manifold of the vehicle engine as a source of differential fluid pressure, the chamber 15 being a variable pressure chamber and the chamber 16 being a constant pressure chamber suitably connected to the intake manifold by a conduit (not shown) communicating with the chamber 16 through a suitable fitting 17. The unit 14 is biased to normal or "off" position by a conventional return spring 18.

The pressure movable unit 14 includes a plunger 20 extending into a high pressure cylinder 21 and the plunger 20 is biased to "off" position by a spring 22 in the cylinder 21 associated with a conventional residual pressure valve 23. Within the plunger 20 is a manually operable plunger 25 cooperating with the plunger 20 to displace hydraulic fluid under pressure from the cylinder 21 through a suitable outlet 26 leading through suitable pipe lines 27, diagrammatically indicated in Fig. 5, to the brake cylinders 28 in accordance with conventional practice.

The plunger 20 reciprocates in a bearing 30 suitably sealed against leakage as at 31, 32 and 33, and brake fluid in the cylinder 21 is replenished by seepage around the seal 31 of fluid flowing from a reservoir 35 having a fluid flow opening 36 in the bottom thereof. The means for replenishing brake fluid forms no part of the present invention and need not be illustrated in detail.

For the same reason, the valve mechanism for energizing the motor 10 need not be described in detail. The valve mechanism is housed within a casting 40 forming a part of the pressure responsive unit 14, and within a plate 41 fixed thereto to define an annular valve receiving chamber 42. The plate 41 is provided with a cylindrical extension 43 axially thereof and extending in the opposite direction from the plunger 20 to receive a slidable plunger 44 transmitting movement to the plunger 25 in a manner to be described.

The plunger 44 carries the valve mechanism which comprises a valve body 46 flexibly connected as at 47 to the plunger 44 and being urged toward the left in Fig. 5 by a spring 48. The valve body carries a resilient valve element 49 normally engaged with a seat 50 formed on a sleeve 51 manually movable by the plunger 44 and engaging the plunger 25. Upon movement of the sleeve 51 to the left against the tension of a spring 52, the seat 50 leaves the valve element 49 and the latter, in its movement to the left in Fig. 5, engages a seat 53 formed on the casting 40 within the chamber 42.

The chamber 42 communicates with the motor chamber 16 through a passage 55, thus maintaining vacuum in the chamber 42. This chamber communicates with an annular space 55' around the sleeve 51 and this space communicates through passage 56 with the motor chamber 15. With the parts in the position shown in Fig. 5, the motor will be vacuum suspended since the motor chamber 15 will communicate through passage 56, space 55', chamber 42 and passage 55 with the motor chamber 16, the latter always being in communication with the intake manifold through the connection 17.

Within the valve seat 50 is an annular chamber 60 communicating through radial ports 61 with an axial bore 62 in the plunger 44. This bore, in turn, communicates through radial passages 63 with an annular space 64 around the right-hand end of the plunger 44. Beyond the plunger 44 the sleeve 43 is open and communicates through a fixed surrounding sleeve 65 with an air cleaner 66 fixed to the motor casing section 11. The air cleaner is associated with a casting 67 carrying suitable bearing and sealing means generally indicated by the numeral 68.

The right-hand end of the plunger 44, as viewed in Fig. 5, is provided with a deep axial recess 70 in the inner end of which is arranged a resilient washer 71 engaged by a head 72 formed on the end of a push rod 73. The washer 71 permits the push rod to rock out of axial alignment with the plunger 44 in the pedal-operated movement of the rod 73, described below.

The outer end of the fixed sleeve 65 is engaged by the adjacent end of a sealing boot 75, the other end of which is sealed with respect to the push rod 73 as at 76 (Fig. 1).

The operating mechanism for the push rod 73 is shown in Figs. 1, 2 and 3. Referring to Fig. 1, the numeral 80 designates the fire wall of a motor vehicle to the left of which is the engine compartment and to the right of which is the driving compartment of the vehicle. The booster mechanism shown in Fig. 5 is fixed to the fire wall 80 by a suitable bracket 81 connected by bolts 82 (Figs. 1 and 5) to the casting 67. The boot 75 and its push rod extend within a bracket 82' connected in any suitable manner to the fire wall 80. This bracket is of inverted U shape as shown in Fig. 2 and is flanged at its bottom edges as at 83 and 84. Accordingly, the bottom of the bracket is open. The arrangement of this bracket in the driver's compartment will be apparent from the conventional vehicle parts illustrated, including the fire wall 80 and the steering column 85, illustrated in broken lines in Fig. 1.

A bearing bracket 90 is carried by the bracket 82'. The bracket 90 forms no part per se of the present invention and has been lightly shown in construction lines in Fig. 1 to avoid confusion. A portion of this bracket is shown in section in Fig. 2. Referring to such figure, the bracket 90 is provided with a foot 91 fixed beneath the flange 83 by means such as a bolt 92 and almost directly therebeneath the bracket 90 is provided with a bearing 94 supporting a shaft 95 for rocking movement. One end of this shaft, which will be the end toward the observer in Fig. 1, has a crank 96 fixed thereto by a nut 97 and the upper end of the crank 96 is pivotally connected as at 98 to the forked end of a clevis 99 fixed on the end of the push rod 73. Obviously rocking movement of the shaft 95 transmits movement through the crank 96 to the push rod 73 to operate the booster motor. Swinging movement of the axis of the pin 98 from the solid line "off" position in Fig. 1 on an arc of a circle to the dotted line or fully applied brake position is accommodated by virtue of the fact that the push rod 73 (Fig. 5) is permitted to rock by the resilient washer 71.

Adjacent the far side thereof, or the right-hand end as viewed in Fig. 2, a cam arm 100 is fixed to the shaft 95 by a nut 101, a relatively heavy washer 102 being interposed between the nut and the cam arm. It will be noted in Fig. 2 that the shaft 95 is shouldered for engagement by the crank arm 96 and the cam arm 100, thus permitting the nuts 97 and 101 to clamp the parts together without binding against the bearing 94. The cam arm 100 has a developed cam surface 105 which is convex from end to end, for a purpose to be described.

The crank arm 96 and the cam arm 100 occupy the solid line positions shown in Fig. 1. One end of a C lever 106 is pivotally connected as at 107 to the cam arm 100. This C lever is arranged in the plane of the washer 102 and has clearance with respect to the latter in the "off" positions of the parts, the C lever being pivotally connected to the cam arm 100 to the right thereof as viewed in Fig. 2. The other end of this C lever is connected as at 108 to a tension spring 109, the opposite end of which is connected to any suitable means fixed to the flange 83, for example a small projection 110 on such flange (Fig. 3). The points 107, 108 and 110 are in alignment with each other in any turned position of the shaft 95 and associated elements since the C lever is pivoted as at 107 to the cam arm 100 and the point 107 never swings upwardly beyond the point shown in Fig. 1. In the "off" positions of the parts, the line of the points 107, 108 and 110 is above the axis of the shaft 95, and accordingly the spring 109 acts as an overcenter spring tending in the "off" positions of the parts to turn the shaft 95 clockwise to assist in maintaining the parts in "off" positions. It will become apparent that when the device is operated to rock the shaft in a counter-clockwise direction, the line of the points 107, 108 and 110 will cross the axis of the shaft 95 and thereafter the force of the spring 109 will tend to rotate the shaft 95 counterclockwise to add assistance to the forces moving the parts in a brake-applying operation.

The bearing bracket 90 supports a pedal lever indicated as a whole by the numeral 115, by means of a pivot pin 116 intermediate the ends of the pedal lever. The pedal lever has a lower end 117 forming the pedal end provided with a conventional pedal pad 118. The opposite end 119 of the lever provides the operating means for moving the cam arm 100 and associated elements. Such end of the lever has its extremity 120 (Fig. 4) offset to lie beneath the flange 83 of the bracket 82' and against the opposite face of the lever end 119 a plate 121 is fixed by bolts 122. The plate 121 and offset lever end 120 form a fork rotatably supporting a roller 123 engageable with the cam surface 105 of the cam arm 100. The flange 83 (Fig. 1) is provided with an upwardly offset portion 125, the sloping wall 126 of which carries a bolt 127 on the lower end of which is arranged a cushion pad 128 arranged in the plane of and engageable with the offset lever arm 120 to limit turning movement of the pedal lever 115 in a counterclockwise direction to the "off" position as shown in Fig. 1.

As previously stated, the cam surface 105 is developed to provide the desirable ratios between movement of the pedal pad 118 and the push rod 73, thus determining the rate of progressively increasing force which must be applied to the brake pedal as the pedal-applying action progresses. For the purpose of describing such desirable ratios, seven points or stations have been arbitrarily indicated on the cam surface 105 in Fig. 3 and these stations have been numbered from one to seven. In the following table the desirable leverage ratios for the various stations have been indicated as the roller 123 progresses over the points or stations referred to, and it will be understood that these stations are purely arbitrary points and that the leverage ratio progressively decreases up to approximately the fourth station after which it remains approximately constant unless and until the seventh station is reached, whereupon there is a slight drop in ratio. This station, however, is seldom reached and if it is, it is at this point that operators prefer under emergency conditions to exert as much pedal pressure as possible. The ratios given in the following table for the successive stations indicate the leverage ratio with respect to a basic 1:

| Station: | Ratio |
|---|---|
| 1 | 1.50 |
| 2 | 1.38 |
| 3 | 1.26 |
| 4 | 1.20 |
| 5 | 1.20 |
| 6 | 1.20 |
| 7 | 1.10 |

It will be apparent that the contour of the cam may be designed in accordance with individual characteristics of different brakes and the booster mechanisms therefor, and any desirable cam arm may be employed in any given installation.

*Operation*

The parts normally occupy the positions shown in Fig. 5 and shown in solid lines in Fig. 1. When the operator pushes on the pad 118, the lever arm 119 leaves its stop 128 and, with the lever rotating on the axis of the pivot 116, the roller 123 will apply force to the cam arm 100, through the cam surface 105 thereof, to turn the shaft 95 in an anti-clockwise direction. Similar turning movement is imparted to the crank arm 96 thus moving the push rod 73 toward the left as viewed in Figs. 1 and 5. Such movement of the push rod is imparted through members 44 and 51 to move the latter against the tension of the spring 52. The valve seat 50 will then move to the left and its movement will be followed by the valve body 46 through the action of the spring 48. Thus the valve element 49 will follow the valve seat 50 to the left until the valve member 49 engages the seat 53. At such lapped valve point, communication will be cut off between the chamber 42 and the annular space 55' and thus the two motor chambers 15 and 16 will be disconnected from each other.

Upon further movement of the rod 73 toward the left in Fig. 5, the valve element 49 will remain stationary in engagement with the seat 53, continued movement of the member 44 toward the left being provided for through the resiliency of the member 47. Such movement will disengage the seat 50 from the valve element 49, and thereupon air will flow into the member 43, through port 63, bore 62, ports 61, space 60, around the valve 50 and thus into the motor chamber 15 through the annular space 55' and passage 56.

The differential pressure thus set up will move the pressure responsive unit 14 to the left. Thus the manually operated plunger 25 and the power operated plunger 20 will both move to the left to displace fluid from the cylinder 21 to the brake cylinders in the usual manner. It will be obvious that the valve mechanism provides a follow-up operation, the valves lapping whenever movement of the push rod 73 stops to cut off the admission of air to the motor chamber 15. The brake-applying operation continues to the extent desired and the reaction of pressure developed in the cylinder 21 will be felt by the operator through the pedal in the usual manner.

The brake is released by releasing pressure of the foot against the pad 118. The spring 52 then moves the member 51 to the right in Fig. 5 to engage the valve seat 50 with the valve element 49 and thus move the valve body 46 to the right against the tension of the spring 48. This action opens the space at the valve seat 53 to restore normal communication between the motor chambers 15 and 16. The return spring 18, as the pressure differential in the motor chambers drops, moves the pressure responsive unit 14 to the right toward the "off" position.

Attention is invited to the fact that the spring 52 is stronger than and consequently enabled to overpower the spring 48. Thus, in the absence of force applied to the push rod 73, the spring 52 overpowers the spring 48 and holds the valve parts in the normal motor-deenergizing position shown in Fig. 5. Thus the net force of the spring 52 is applied to the elements 51, 44, 73, etc. to return these parts to normal position when pressure is released from the pedal pad 118.

In some forms of booster brake mechanisms a single spring is employed for biasing the valve device to "off" position and for biasing the push rod and the parts connected thereto to "off" position. Regardless of whether a single valve spring is employed, or two springs as shown in Fig. 5, there is a net spring force present operative for returning the parts to normal position and holding them in such position when the brake pedal is released. In this connection it will be noted that the spring 18 transmits no force to the manually operable parts to tend to hold them in the "off" positions since movement of the unit 14 to "off" position is limited and its movement is stopped prior to the point at which movement of the manually operable parts is stopped. Accordingly it is only a spring or springs associated with the valve mechanism that transmit forces tending to return the manually operable parts to "off" positions and to maintain them in such positions.

The force applied to the brake pedal operates against the tension of the spring 52 in the present case to initially operate the valve mechanism to energize the motor 10, and this is what is commonly termed the "cut-in" point. This resistance of the return spring or springs for the manually operable parts creates a false reaction on the brake pedal in that it is not related to braking pressures in the cylinder 21, which pressures it is desired to "feel" in the brake pedal. It is highly desirable to eliminate the "lump" occurring in initial operation of the brake pedal at the "cut-in" point and the present device is admirably suited for this purpose. Initial pressure is applied by the roller 123 to the cam arm 100 at the point of maximum effective lever length of the latter, thus utilizing a relatively high movement ratio as indicated by the foregoing table to minimize the force necessary for compressing the spring 52 at the "cut-in" point.

It is further desirable to use a higher ratio of angular movement of the brake pedal to linear movement of the plunger 25 during the beginning of the brake-applying operation than in the later stages of such operation. If the cam surface 105 were straight and approximately radial relative to the shaft 95, the movement ratio would decrease too rapidly. By using the approximate developed convex cam surface shown, which surface is approximately convolute relative to the shaft 95, any desired progressive decrease in ratio may be obtained. Accordingly, the operator is called upon to exert less force during initial portions of a brake-applying operation and a greater force during, for example, the last half of the brake-applying operation.

The present apparatus also is particularly adapted for use with the newly developed types of brake pedals wherein the pivots of the pedals are above the pads thereof as shown in Fig. 1. Under such conditions the weight of the lever arm 117, in the "off" position of the parts, substantially overbalances the lever arm 119 and the parts carried thereby. Under such conditions it is necessary to make the return spring 52, or any comparable return spring, sufficiently strong to support the overbalancing weight of the lever arm 117 and the pedal pad 118. This necessity is eliminated by the provision of the C lever 106. In the brake releasing operation, and prior to return of the brake lever to the fully "off" position, the theoretical line connecting points 107, 108 and 110 will cross the axis of the shaft 95 moving upwardly toward the left in Fig. 1. The tension of the spring 109, therefore, in the last portion of the pedal travel to "off" position, through the pivot 107, will transmit a force to the cam arm 100 tending to turn this member in a clockwise direction to assist the spring 52 in returning the parts fully to "off" positions and maintaining them in such positions.

When the pedal 118 is pushed downwardly to apply the brakes, very little travel of the brake pedal is necessary to move the line of the points 107, 108 and 110 downwardly and to the right in Fig. 1 across the axis of the shaft 95. Thereafter, the tension of the spring 109 tends to rock the shaft 95 counterclockwise, thus adding some little force to assist the operator in the brake-applying operation. This force is appreciable but never sufficient fully to overcome the tension of the spring 52, and accordingly the latter is operative for controlling the valves of the motor 10 during any release of the brake pedal. The spring 109 smooths out the operation of the device and assists in holding the parts in the "off" position.

In some modern booster brake constructions, features are employed which provide a two-stage operation through which less force on the pedal is required during the first part of the brake-applying operation and more force is required in the later portion of the operation. However, such structures do not provide a smoothly progressing change in the ratio of brake-applying forces to the pedal as is true of the present construction.

As previously stated, the cam surface 105 is formed convexly in order to give the progression in lever ratios referred to above. It will be noted that the pedal lever 115 and rock shaft 95 turn on fixed axes and that the point of contact of the roller 123 with the cam surface 105 is always to one side of the plane of the fixed axes referred to, namely, above such plane. As the brake pedal is operated, the point of contact between the roller 123 and cam surface 105 moves progressively toward the plane between the two fixed axes, thus progressively shortening the effective lever arm of the cam arm 100, this progressive shortening being modified by the formation of the cam surface 105 to give the highly desirable progressive changes in the ratios of movement of the lever arm 115 relative to the push rod 73.

I claim:

1. An operating mechanism for a booster brake having a motor and a member movable in one direction to energize said motor, comprising a pedal lever mounted to rock on a fixed axis and having a normal "off" position, said lever having a pedal arm overbalancing said lever whereby the latter tends gravitationally to move from said normal "off" position, a rock shaft mounted to turn on a second fixed axis, means for translating rocking movement of said rock shaft into movement of said member in said direction, a cam arm carried by said rock shaft and having a cam surface engageable by a portion of said pedal lever, the point of contact of said lever portion with said cam surface lying to one side of a plane passing through said axes and movement of said pedal lever away from a normal "off" position moving said point closer to said plane whereby the effective lever length of said cam arm progressively decreases as said pedal lever moves away from said "off" position, and over-center spring means having one end fixed and its other end connected to said cam arm, said ends of said spring means, when said pedal lever is in off position, being arranged in a line to one side of said second fixed axis whereby said spring means exerts a force tending to turn said rock shaft in one direction to hold said lever in said "off" position, said line moving across said second fixed axis upon initial movement of said pedal lever whereby said spring means exerts a force tending to turn said rock shaft in the opposite direction to apply rotational force to said cam arm in the opposite direction.

2. A mechanism constructed in accordance with claim 1 wherein said cam surface substantially throughout its effective length is convex in a direction away from said plane and so shaped that the ratio of turning movement of said pedal lever to said member progressively decreases as said pedal lever moves away from its normal "off" position to a predetermined intermediate position and thereafter remains relatively constant through a remaining portion of the movement of said pedal lever.

3. An operating mechanism for a booster brake having a motor and a member movable in one direction to energize said motor, comprising a pedal lever mounted to rock on a fixed axis and having a normal "off" position, said lever having a pedal arm overbalancing said lever whereby the latter tends gravitationally to move from said normal "off" position, a rock shaft mounted to rock on a second fixed axis, means for translating rocking movement of said rock shaft into movement of said member in said direction, a cam arm carried by said rock shaft and having a cam surface engageable by a portion of said pedal lever, the point of contact of said lever portion with said cam arm lying to one side of a plane passing through said axes and movement of said pedal lever away from a normal "off" position moving said point closer to said plane whereby the effective lever length of said cam arm progressively decreases as said pedal lever moves away from said "off" position, and an over-center spring device comprising a C lever having one end pivotally connected to said cam arm, and a spring connected at one end to the other end of said C lever and having its other end connected to a fixed point, there being a straight line passing through the ends of said lever and said other end of said spring, which line lies to one side of the axis of said rock shaft when said pedal lever is in its normal "off" position to tend to maintain said pedal lever in such position, movement of the first named end of said C lever upon operation of said cam arm moving said line across the axis of said rock shaft whereby said spring tends to move said rock shaft in a brake-applying direction.

4. A mechanism constructed in accordance with claim 3 wherein said cam surface substantially throughout its effective length is convex in a direction away from said plane and so shaped that the ratio of turning movement of said pedal lever to said member progressively decreases as said pedal lever moves away from its normal "off" position to a predetermined intermediate position and thereafter remains relatively constant through a remaining portion of the movement of said pedal lever.

5. In a hydraulic booster brake mechanism comprising a fluid pressure operated motor having a pressure movable unit, a manually movable plunger, a hydraulic fluid chamber into which portions of said manually movable plunger and said pressure movable unit project to displace fluid from said chamber upon energization of said motor, said plunger being displaceable relative to said pressure movable unit for displacing hydraulic fluid prior to motor energization, valve mechanism for controlling energization of said motor, spring means acting against said valve mechanism and said manually operable plunger to tend to return both to normally "off" positions; a pedal lever mounted to rock on a fixed axis, a rock shaft mounted to rock on a second fixed axis, means for translating rocking movement of said rock shaft into movement of said manually operable plunger and said valve mechanism in a motor energizing direction, and a cam arm carried by said rock shaft and having a cam surface engageable by a portion of said pedal lever, the point of contact of said lever portion with said cam lying to one side of a plane passing through said axes and movement of said pedal lever away from a normal "off" position moving said point closer to said plane whereby the initial effective lever length of said cam arm progressively decreases as said pedal lever moves away from said normal "off" position to provide an initial "soft" pedal when overcoming said spring means, operating said valve mechanism and initially displacing said plunger into said hydraulic fluid chamber independent of said pressure movable unit.

6. Apparatus constructed in accordance with claim 5 wherein said cam surface is convex in a direction away from said plane and so shaped that the ratio of turning movement of said brake lever to said manually operable member progressively decreases as said brake lever moves away from its normal "off" position to a predetermined intermediate position and thereafter remains relatively constant through a remaining portion of the movement of said pedal lever.

7. Apparatus constructed in accordance with claim 5 provided with over-center spring means having one end fixed and having its other end mechanically connected to said rock shaft eccentrically thereof, said spring means, when said pedal lever is in said normal "off" position, exerting a force in a line to one side of the axis of said rock shaft tending to hold said pedal lever in such position and the line of force of said spring means being movable across the axis of said rock shaft upon relatively short movement of said pedal lever away from its normal "off" position to exert a force in a line to the other side of said axis of said rock shaft to tend to turn the latter and assist movement of said pedal lever away from said normal "off" position.

8. Apparatus constructed in accordance with claim 5 wherein said cam surface is convex in a direction away from said plane and so shaped that the ratio of turning movement of said pedal lever to said manually movable member decreases as said pedal lever moves away from said normal "off" position to a predetermined position and thereafter remains relatively constant through a remaining portion of the movement of said pedal lever, and over-center tension spring means connected between two points one of which is fixed and the other of which is mechanically connected to said rock shaft eccentrically thereof, said spring means exerting tension in a line to one side of said plane when said pedal lever is in said "off" position to tend to turn said rock shaft in one direction to hold said lever in such position, and said line moving across the pivot axis of said rock shaft upon initial movement of said pedal lever to a predetermined extent to exert a force tending to turn said rock shaft in the opposite direction to apply a brake-applying rotational force to said rock shaft.

9. Apparatus constructed in accordance with claim 5 provided with an over-center spring device comprising a C lever having one end pivotally connected to said cam arm and extending around the axis of said rock shaft, and a tension spring connected at one end to the other end of said C lever and having its other end connected to a fixed point, there being a straight line passing through the ends of said lever and said other end of said spring, which line lies to one side of the axis of said rock shaft when said pedal lever is in its normal "off" position to tend to turn said rock shaft in one direction to maintain said pedal lever in such position, movement of the first named end of said C lever upon operation of said cam arm moving said line across the axis of said rock shaft whereby said spring tends to turn said rock shaft in the opposite direction in a brake-applying movement.

References Cited in the file of this patent

UNITED STATES PATENTS

| | | |
|---|---|---|
| 309,125 | Best | Dec. 9, 1884 |
| 1,531,467 | White | Mar. 31, 1925 |
| 1,824,034 | Cady | Sept. 22, 1931 |
| 1,902,524 | Roth | Mar. 21, 1933 |
| 1,921,590 | Staude | Aug. 8, 1933 |
| 1,975,478 | Rockwell | Oct. 2, 1934 |
| 2,006,487 | Sorensen | July 2, 1935 |
| 2,037,869 | Wall | Apr. 21, 1936 |
| 2,130,799 | Hofstetter | Sept. 20, 1938 |
| 2,168,719 | Staude | Aug. 8, 1939 |
| 2,229,247 | Kamenarovic | Jan. 21, 1941 |
| 2,241,374 | Alfieri | May 13, 1941 |
| 2,315,632 | Martindill | Apr. 6, 1943 |
| 2,318,756 | Chouings | May 11, 1943 |
| 2,399,150 | Snider | Apr. 23, 1946 |
| 2,458,803 | Stelzer | Jan. 11, 1949 |
| 2,557,758 | Perry | June 19, 1951 |
| 2,690,740 | Hupp | Oct. 5, 1954 |
| 2,752,892 | Banker | July 3, 1956 |